(12) United States Patent
Ye et al.

(10) Patent No.: US 8,452,298 B2
(45) Date of Patent: May 28, 2013

(54) METHOD AND DEVICE FOR MANAGING INTERFACE CIRCUITS BETWEEN ACCESS NETWORK AND CORE NETWORK

(75) Inventors: Sihai Ye, Shenzhen (CN); Yong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 128 days.

(21) Appl. No.: 13/005,945

(22) Filed: Jan. 13, 2011

(65) Prior Publication Data

US 2011/0111763 A1    May 12, 2011

Related U.S. Application Data

(63) Continuation of application No. PCT/CN2009/073024, filed on Jul. 31, 2009.

(30) Foreign Application Priority Data

Aug. 4, 2008    (CN) .......................... 2008 1 0134866

(51) Int. Cl.
*H04W 72/00*    (2006.01)
(52) U.S. Cl.
USPC ...................... 455/450; 455/414.4; 455/432.2
(58) Field of Classification Search
USPC ......................................................... 455/450
See application file for complete search history.

(56) References Cited

U.S. PATENT DOCUMENTS

| 2004/0003092 | A1* | 1/2004 | Lehto et al. ................... 709/227 |
| 2009/0209255 | A1* | 8/2009 | Lassers et al. ................ 455/436 |

FOREIGN PATENT DOCUMENTS

| CN | 1508992 | A | 6/2004 |
| CN | 1514612 | A | 7/2004 |
| CN | 1984054 | A | 6/2007 |
| CN | 101155414 | A | 4/2008 |
| CN | 101176357 | A | 5/2008 |
| CN | 101330668 | A | 12/2008 |
| CN | 101330668 | B | 6/2012 |
| EP | 1333695 | A1 | 8/2003 |
| WO | WO 0158086 | A2 | 8/2001 |

OTHER PUBLICATIONS

Office Action issued in corresponding Chinese Patent Application No. 200810134866.6, mailed Sep. 7, 2011.
Office Action issued in corresponding Chinese Patent Application No. 200810134866.6, mailed Jan. 18, 2011.
International Search Report issued in corresponding International Patent Application No. PCT/CN2009/073024, mailed Nov. 5, 2009.

(Continued)

*Primary Examiner* — Justin Lee
(74) *Attorney, Agent, or Firm* — Brinks Hofer Gilson & Lione (57) ABSTRACT

A method of a device for managing interface circuits between an access network and a core network that relate to a telecommunication technology field includes: sending, by a resource management entity, a circuit management message to a control function entity, converting in format and sending, by the control function entity, the circuit management message to a resource coordination entity, wherein the circuit management message is configured to instruct the resource coordination entity to implement a circuit management operation; or receiving, by the resource management entity, a circuit management message sent by the resource coordination entity, converted in format and forwarded by the control function entity, and implementing, by the resource management entity, the circuit management operation according to the resource management message.

4 Claims, 5 Drawing Sheets

OTHER PUBLICATIONS $3^{RD}$ Generation Partnership Project; Technical Specification Group Core Network and Terminals; Bearer-independent circuit-switched core network; Stage 2 (Release 6). 3GPP TS 23.205, V6.4.0, Dec. 2005.

Written Opinion of the International Searching Authority issued in corresponding PCT Patent Application No. PCT/CN2009/073024, mailed Nov. 5, 2009.

Extended European Search Report issued in corresponding European Patent Application No. 09804481.1, mailed Jun. 16, 2011.

ETSI TC-RES, "Radio Equipment and Systems (RES); Digital Enhanced Cordless Telecommunications/Global System for Mobile Communications (DECT/GSM) Interworking Profile; Mobile Services Switching Centre (MSC)—Fixed Part (FP) Interconnection", European Telecommunication Standard, Sep. 1996. ETS 300 499.

Global System for Mobile Communications, $3^{rd}$ Generation Partnership Project; Technical Specification Group Services and Systems Aspects; Network Architecture (Release 8). 3GPP TS 23.002, V8.2.0, Dec. 2007.

Office Action issued in corresponding Chinese Patent Application No. 200810134866.6, mailed Dec. 21, 2011.

Xu et al., "3G Radio Access Network Interface Protocol Evolution" Jul. 7, 2006.

* cited by examiner

METHOD AND DEVICE FOR MANAGING INTERFACE CIRCUITS BETWEEN ACCESS NETWORK AND CORE NETWORK

CROSS-REFERENCE TO RELATED APPLICATIONS

This application is a continuation of International Application No. PCT/CN2009/073024, filed on Jul. 31, 2009, which claims priority to Chinese Patent Application No. 200810134866.6, filed on Aug. 4, 2008, both of which are hereby incorporated by reference in their entireties

FIELD OF THE APPLICATION

The present application relates to the telecommunication technology field, and in particular, to a method, a device, and a system for managing interface circuits between an access network and a core network.

BACKGROUND OF THE APPLICATION

According to the regulations in the 3GPP 29.232 protocol, in the case of mobile switch center (MSC) pool networking, a media gateway (MGW) is connected to multiple MSC servers. To connect to multiple MSC servers, a physical MGW needs to be divided into multiple virtual media gateways (VMGWs) that are controlled by separate MSC servers. In this case, the A interface circuits between MGW and base station controller (BSC) need to be included in separate VMGWs.

To share A interface circuits among multiple MSC servers, the MGW is responsible for allocating and releasing A interface circuits. That is, the mapping between A interface circuit and circuit information is stored in the MGW, and only the mapping between a BSC and the MGW is stored in a MSC server, where the circuit information includes a circuit identification code (CIC) and a termination identifier (TID) of an A interface circuit.

When receiving a call request from the BSC, the MSC server obtains an ID of the BSC that sends the call request, queries the stored mapping between BSC and MGW according to the ID of the BSC, and requests A interface circuits of the MGW corresponding to the BSC. Then, the MGW allocates or releases relevant A interface circuits for the MSC server according to the resource allocation or release request of the MSC server.

The prior art has at least the following disadvantages: The prior art proposes only a scheme for allocating or releasing A interface circuits through an MGW, but does not involve a technology for managing A interface circuits through the MGW.

In the existing technology, the protocol for managing A interface circuits is the Base Station System Application Part (BSSAP). The BSSAP protocol stack runs only in the BSCs and MSC servers. If the management of A interface circuits is implemented through the MGW, the MGW needs to support the BSSAP protocol stack, which is, however, carried on the Signaling Connection Control Part (SCCP) protocol. Therefore, to support the BSSAP protocol stack, the MGW needs to support the SCCP protocol. This increases the management cost and complexity of the MGW.

SUMMARY OF THE APPLICATION

A method for managing interface circuits between an access network and a core network is provided in an embodiment to reduce the cost of the resource management entity in managing interface circuits between an access network and a core network.

The method for managing interface circuits between an access network and a core network in an embodiment includes:

sending, by a resource management entity, a circuit management message to a control function entity so that the control function entity converts the circuit management message in format and sends the message to a resource coordination entity, wherein the circuit management message is used to instruct the resource coordination entity to implement a circuit management operation; or receiving, by a resource management entity, a circuit management message sent by a resource coordination entity, converted in format and forwarded by a control function entity, and implementing, by the resource management entity, a circuit management operation according to the circuit management message.

The method for managing interface circuits between an access network and a core network in an embodiment includes:

converting in format and then sending, by the control function entity, the circuit management message or a circuit management result message sent by the resource management entity to the resource coordination entity, where the circuit management result message sent by the resource management entity is forwarded by the control function entity to the resource coordination entity after the resource management entity implements the circuit management operation according to the circuit management message of the resource coordination entity; or converting in format and then sending, by the control function entity, the circuit management message or a circuit management result message sent by the resource coordination entity to the resource management entity, wherein the circuit management result message sent by the resource coordination entity is forwarded by the control function entity to the resource management entity after the resource coordination entity implements the circuit management operation according to the circuit management message of the resource coordination entity.

In addition, a resource management entity is provided in an embodiment to reduce the cost of the resource management entity in managing interface circuits between an access network and a core network.

The resource management entity in an embodiment includes:

a sending unit, configured to send a circuit management message to a control function entity so that the control function entity converts the circuit management message in format and sends the message to a resource coordination entity, wherein the circuit management message is used to instruct the resource coordination entity to implement a circuit management operation;

a receiving unit, configured to receive a circuit management message sent by the resource coordination entity, converted in format and forwarded by the control function entity; and an operating unit, configured to instruct the sending unit to send the circuit management message after implementing the circuit management operation; or implement the circuit management operation according to the circuit management message received by the receiving unit.

A control function entity is provided in an embodiment to reduce the cost of the resource management entity in managing interface circuits between an access network and a core network.

The control function entity in an embodiment includes:

a message receiving unit, configured to receive a circuit management message or a circuit management result message sent by a resource management entity or a resource coordination entity;

a format converting unit, configured to convert a format of the received circuit management message or circuit management result message; and a message sending unit, configured to: send the circuit management message or circuit management result message after conversion by the format converting unit to the resource coordination entity when the circuit management message or circuit management result message is sent by the resource management entity; or send the circuit management message or circuit management result message after conversion by the format converting unit to the resource management entity when the circuit management message or circuit management result message is sent by the resource coordination entity.

In the method and device for managing interface circuits between an access network and a core network in embodiments, a control function entity is used to convert the format of the circuit management message between resource management entity and resource coordination entity. In this way, no new protocol needs to be developed on the resource management entity to support management of the resource management entity for the interface circuits between an access network and a core network. Thus, the embodiments reduce the cost of the resource management entity in managing interface circuits between an access network and a core network and improve the operability of the resource management entity for managing interface circuits between an access network and a core network.

DETAILED DESCRIPTION OF THE EMBODIMENTS

To make the technical solutions more comprehensible, reference is made to the accompanying drawings and embodiments as follows.

Figure 1:
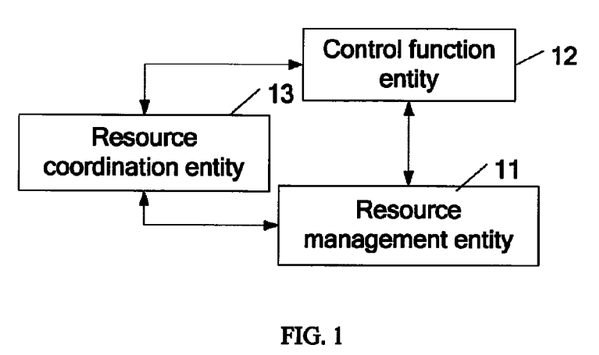
FIG. 1 shows a structure of a system for managing interface circuits between an access network and a core network according to a first embodiment.

As shown in FIG. 1, a system for managing interface circuits between an access network and a core network in the first embodiment can include the following components: a resource management entity 11, a control function entity 12, and a resource coordination entity 13, wherein the resource coordination entity 13 is connected to at least one resource management entity 11 through interface circuits between an access network and a core network.

The resource management entity 11 is configured to: send a circuit management message to the control function entity 12, and receive a circuit management result message sent by the resource coordination entity 13 forwarded by the control function entity 12 after format conversion; or receive a circuit management message sent by the resource coordination entity 13 forwarded by the control function entity 12 after format conversion, implement a circuit management operation, and send a circuit management result message to the control function entity 12 after implementing the circuit management operation.

The control function entity 12 is configured to: convert a format of the circuit management message or circuit management result message sent by the resource management entity 11, and send the circuit management message or circuit management result message after format conversion to the resource coordination entity 13; or convert a format of the circuit management message or circuit management result message sent by the resource coordination entity 13, and send the circuit management message or circuit management result message after format conversion to the resource management entity 11.

The resource coordination entity 13 is configured to: send a circuit management message to the control function entity 12, and receive a circuit management result message sent by the resource management entity 11 forwarded by the control function entity 12 after format conversion; or receive a circuit management message sent by the resource management entity 11 forwarded by the control function entity 12 after format conversion, implement a circuit management operation, and send a circuit management result message to the control function entity 12 after implementing the circuit management operation.

Interface circuits between an access network and a core network may include A interface circuits and S1-mobility management entity (S1-MME) interface circuits. In the circuit domain, the resource management entity can be implemented through an MGW, the control function entity through an MSC server, and the resource coordination entity through a BSC. The interface circuits between an access network and a core network are A interface circuits. In the packet domain, the resource management entity can be implemented through a serving gateway or packet serving node, the control function entity through an MME, and the resource coordination entity through a BSC. The interface circuits between an access network and a core network are S1-MME interface circuits. The implementation principles are the same regardless of the network architecture.

The following takes network entities in the circuit domain for example to describe the process of managing A interface circuits in the circuit domain in an embodiment.

In an embodiment, to implement management on A interface circuits through an MGW, and reduce the cost and complexity of management, the MSC server handles the part that involves the BSSAP. The MSC server converts BSSAP messages into messages that can be identified by the MGW, and sends the messages after conversion to the MGW to implement relevant circuit management operation.

The circuit management message between the MGW and the BSC includes but is not limited to a circuit reset/blockage request message. Accordingly, the circuit management result message between the MGW and the BSC includes but is not limited to a circuit reset/blockage result message. The following takes the scenario where the circuit management message is a circuit reset/blockage request message for example to describe the process and principles of the system in the first embodiment.

In an embodiment, the MGW can initiate a reset/blockage operation on A interface circuits, or manage A interface circuits according to the request of the MSC server or operation and maintenance (OM) device.

(1) Initiating the Reset/Blockage Operation on A Interface Circuits at the MGW Side In this case, after implementing reset/blockage on the A interface circuits at the local end, the MGW sends a circuit reset/blockage request message to the MSC server. The MSC server converts the format of the circuit reset/blockage request message, and then sends the circuit reset/blockage request message to the BSC. The BSC implements reset/blockage on A interface circuits at the local end according to the converted circuit reset/blockage request message, and then sends a circuit reset/blockage result message to the MSC server.

After receiving the circuit reset/blockage result message, the MSC server converts the format of the circuit reset/blockage result message, and then sends the circuit reset/blockage result message to the MGW. The MGW sends the circuit management result to the OM device according to the converted circuit reset/blockage result message.

(2) Initiating Reset/Blockage on Circuits by the BSC

In this case, after implementing reset/blockage on the A interface circuits at the local end, the BSC sends a circuit reset/blockage request message to the MSC server. The MSC server converts the format of the circuit reset/blockage request message, and then sends the circuit reset/blockage request message to the MGW. The MGW implements reset/blockage on A interface circuits at the local end according to the converted circuit reset/blockage request message, and then sends a circuit reset/blockage result message to the MSC server.

After receiving the circuit reset/blockage result message, the MSC server converts the format of the circuit reset/blockage result message, and then sends the circuit reset/blockage result message to the BSC. The BSC sends the circuit management result to the OM device according to the converted circuit reset/blockage result message.

The BSC needs to work with the MGW to implement circuit management operations such as reset and blockage. In this process, the MSC server needs to convert the formats of the interaction messages between BSC and MGW. Specifically, during format conversion, the MSC server converts the circuit management message or circuit management result message of the MGW that complies with the gateway control protocol into the circuit management message or circuit management result message that complies with the BSSAP, or converts the circuit management message or circuit management result message of the MGW that complies with the BSSAP into the circuit management message or circuit management result message that complies with the gateway control protocol.

That is, the BSSAP stack is used for communication between BSC and MSC server, and the gateway control protocol is used for communication between MSC server and MGW. The gateway control protocol in an embodiment can be the 11.248 or MTP3 User Adaptation layer (M3UA) protocol.

It can be seen from the preceding description that in the system provided in the first embodiment, the control function entity converts the format of the circuit management message between resource management entity and resource coordination entity so that no new protocol is required to be developed on the resource management entity to support circuit management of the resource management entity when using the resource management entity to manage the interface circuits between an access network and a core network. Thus, the embodiments reduce the cost of the resource management entity in managing interface circuits between an access network and a core network and improve the operability of the resource management entity for managing interface circuits between an access network and a core network.

The following describes the implementation process of the method for managing the interface circuits between an access network and a core network in an embodiment by combining relevant embodiments.

Embodiment 2

Figure 2:
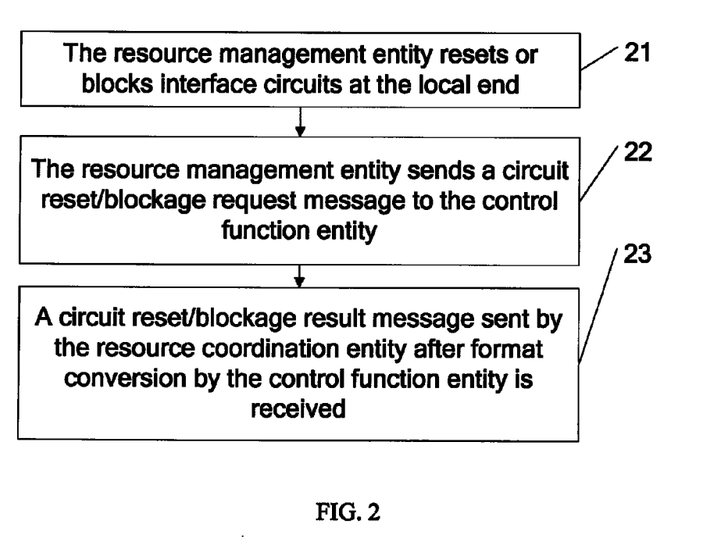
FIG. 2 is a flowchart of a method for managing interface circuits between an access network and a core network according to a second embodiment.

A method for managing interface circuits between an access network and a core network is provided in the second embodiment. As shown in FIG. 2, the method includes the following steps:

Step 21: The resource management entity implements reset/blockage on the interface circuits at the local end, when the resource management entity initiates the circuit reset/blockage operation.

Step 22: The resource management entity sends a circuit reset/blockage request message to the control function entity after completing reset/blockage.

After converting the format of the circuit reset/blockage request message, the control function entity sends the circuit reset/blockage request message to the resource coordination entity to instruct the resource coordination entity to implement relevant circuit management operation.

At this step, the mode of selecting by the resource management entity the control function entity includes: selecting a control function entity at random, or selecting a specified control function entity, or selecting a configured fixed control function entity.

Therefore, for the management operation on a same circuit, different control function entities may be involved at different time points, thus realizing floating management on interface circuits between an access network and a core network.

Step 23: After the resource coordination entity implements relevant circuit management operation, the resource management entity receives the circuit reset/blockage result message sent by the resource coordination entity, and converted in format by the control function entity.

Figure 3:
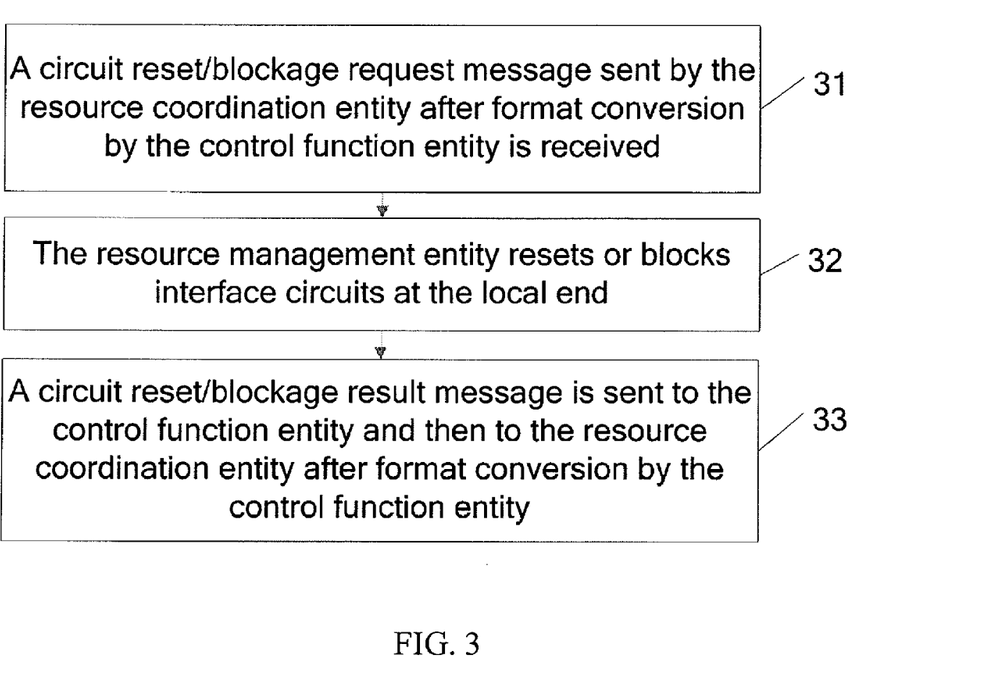
FIG. 3 is a flowchart of a method for managing interface circuits between an access network and a core network according to a third embodiment.

When the resource coordination entity initiates the circuit reset/blockage operation, the method in the third embodiment includes the following steps as shown in FIG. 3:

Step 31: The resource management entity receives a circuit reset/blockage request message sent by the resource coordination entity, and converted in format by the control function entity.

At this step, the mode of selecting by the resource coordination entity the control function entity includes: selecting a control function entity at random, or selecting a specified control function entity, or selecting a configured fixed control function entity.

Similar to the second embodiment, for the management operation on a same circuit, different control function entities may be involved at different time points, thus realizing floating management on interface circuits between an access network and a core network.

Step 32: The resource management entity implements reset/blockage on the interface circuits between an access network and a core network at the local end according to the circuit reset/blockage request message after format conversion.

Step 33: The resource management entity sends a circuit reset/blockage result message to the control function entity and then the control function entity converts in format and sends the circuit reset/blockage result message to the resource coordination entity.

In addition to the circuit reset/blockage operation, the resource management entity can collect statistics about or query the interface circuits between an access network and a core network. The counting operation by the resource management entity on the interface circuits between an access network and a core network can be implemented automatically, or triggered by a circuit query/counting message from the control function entity or OM device.

The circuit counting operations that can be implemented by the resource management entity include counting the number of idle interface circuits, counting the number of occupied interface circuits, counting the number of blocked interface circuits, and counting the number of interface circuits occupied by each control function entity, and the circuit query operations include querying the status of a specified interface circuit and querying the usage condition of interface circuits by a specified control function entity.

When the resource management entity sends the circuit counting or query result to the control function entity or OM device, one of the following modes can be adopted: (1) The resource management entity actively reports the counting result, that is, reports the counting result to the OM device after implementing the relevant counting operation; (2) The resource management entity reports the counting result at fixed time points. This mode applies to the scenario where the requirements for real-time quality are low; (3) The resource management entity reports the counting result as triggered by events. For example, the resource management entity reports the last counting result when receiving a next circuit counting request or query request.

Similar to the first embodiment, the interface circuits between an access network and a core network can include A interface circuits and S1-MME interface circuits. In the circuit domain, the resource management entity can be implemented through an MGW, the control function entity through an MSC server, and the resource coordination entity through a BSC. The interface circuits between an access network and a core network are A interface circuits. In the packet domain, the resource management entity can be implemented through a serving gateway or packet serving node, the control function entity through an MME, and the resource coordination entity through a BSC. The interface circuits between an access network and a core network are S1-MME interface circuits. The implementation principles are the same regardless of the network architecture.

Figure 4:
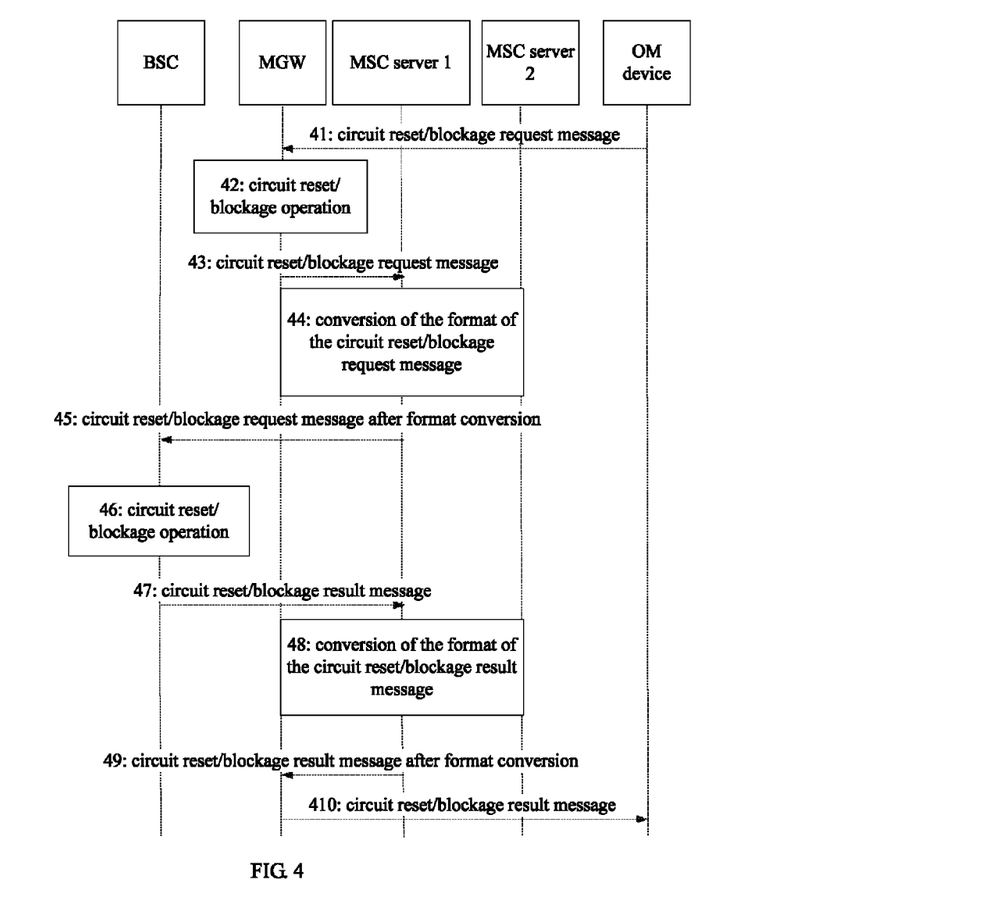
FIG. 4 is a flowchart of a method for managing interface circuits between an access network and a core network according to a fourth embodiment.
Figure 5:
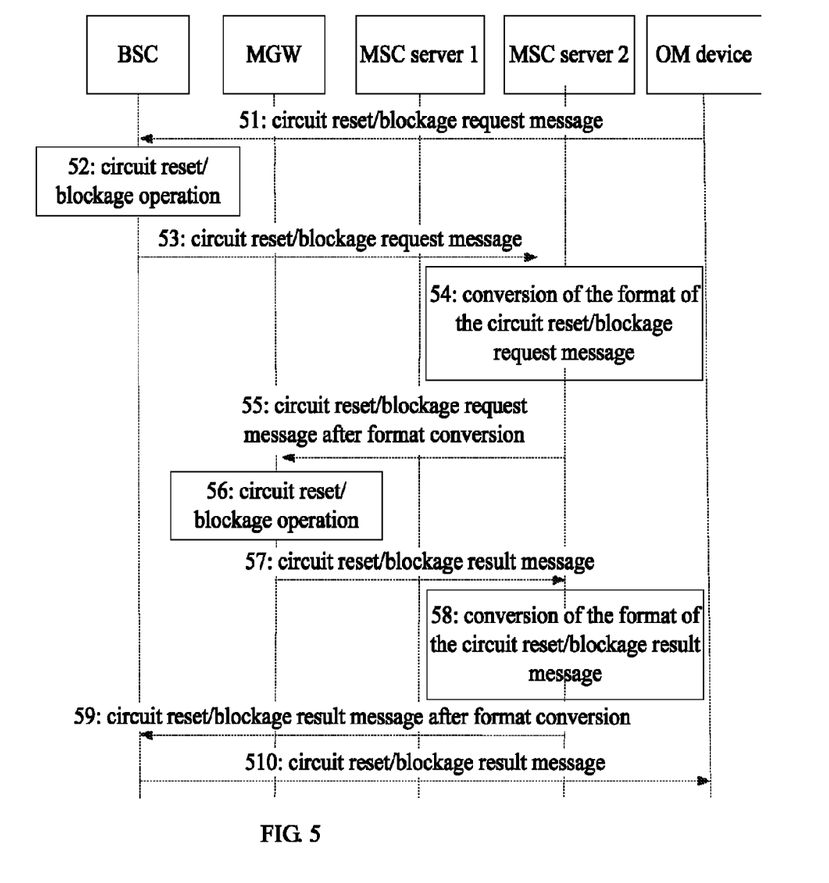
FIG. 5 is a flowchart of a method for managing interface circuits between an access network and a core network according to a fifth embodiment.

In the fourth and fifth embodiments, the scenario where the network entities in the circuit domain are adopted and the circuit management message is a circuit reset/blockage request message is taken for example.

When A interface circuits are allocated and released on the MGW, the mapping between A interface circuits and circuit information, such as TID and CIC is stored on the MGW, and the mapping between BSCs and MGWs is stored on the MSC servers.

The fourth embodiment takes A interface circuit L for example. The OM device initiates a circuit reset/blockage request message for A interface circuit L.

When the OM device sends a circuit reset/blockage request message for A interface circuit L to the MGW, the request message may include the relevant TID and CIC of circuit L, and the specified information about the MSC server that forwards the circuit reset/blockage message sent by the MGW to the BSC.

As shown in FIG. 4, the following steps are included:

Step 41: The OM device sends the circuit reset/blockage request message for A interface circuit L to the MGW.

Step 42: The MGW resolves the circuit reset/blockage message, obtains the related TID and CIC of the circuit, and resets or blocks A interface circuit L at the local end according to the mapping between A interface circuits and circuit information stored on the MGW.

Step 43: After implementing reset/blockage operation at the local end, the MGW sends a circuit reset/blockage request message to MSC server 1. This request message includes the identity information about the target BSC as well as the circuit information about the A interface circuit that needs reset/blockage.

The modes of selecting an MSC server by the MGW to forward the circuit reset/blockage request message include: (1) the MGW selects an MSC server at random; (2) when the circuit reset/blockage request message of the OM device contains information about a specified MSC server, the MGW selects the specified MSC server; (3) the MGW selects a fixed MSC server for each BSC by adopting a static configuration mode. In this embodiment, the implementation of the forwarding process is not limited by the preceding modes. The following takes the mode in which the OM device specifies MSC server 1 for example.

Step 44: MSC server 1 converts the circuit reset/blockage request message that complies with the gateway control protocol into the circuit reset/blockage request message that complies with the BSSAP to facilitate identification by the BSC. MSC server 1 obtains the target BSC through the request. The gateway control protocol in an embodiment can be the H.248 or M3UA protocol.

Step 45: MSC server 1 sends the circuit reset/blockage request message after format conversion to the BSC.

Step 46: After receiving the circuit reset/blockage request message after format conversion, the BSC resets or blocks A interface circuit L at the local end according to the request.

Step 47: After implementing the operation at the local end, the BSC sends a circuit reset/blockage result message to MSC server 1. This message complies with the BSSAP.

Step 48: MSC server 1 converts the circuit reset/blockage result message that complies with the BSSAP into the circuit reset/blockage result message that complies with the gateway control protocol.

Step 49: MSC server 1 sends the circuit reset/blockage result message after format conversion to the MGW.

Step 410: The MGW sends the circuit reset/blockage result message to the OM device to notify the OM device of the reset/blockage operation result.

In the fifth embodiment, the OM device sends the circuit reset/blockage request message for A interface circuit L to the BSC.

As shown in FIG. 5, the following steps are included:

Step 51: The OM device sends the circuit reset/blockage request message for A interface circuit L to the BSC. The request can include the information specified by the MSC server that forwards the circuit reset/blockage message sent by the BSC to the MGW.

Step 52: The BSC resolves the circuit reset/blockage message, obtains the related TID and CIC of the circuit, and resets or blocks A interface circuit L at the local end according to the mapping between A interface circuits and circuit information stored on the BSC.

Step 53: The BSC sends the circuit reset/blockage request message to the MSC server.

According to the difference of the networking mode in the MSC pool, at this step, the modes of selecting an MSC server by the BSC include: (1) selecting an MSC server at random; (2) selecting an MSC server specified by the OM device; (3) selecting the MSC server with the minimum load currently. In this embodiment, the mode in which the BSC selects MSC server 2 is taken for example.

Step 54: MSC server 2 converts the circuit reset/blockage request message that complies with the BSSAP into the circuit reset/blockage request message that complies with the gateway control protocol to facilitate identification by the MGW. MSC server 2 can select an MGW for the BSC according to the mapping between this BSC and the connected MGW stored on MSC server 2, or send the circuit reset/blockage request message after format conversion to all the MGWs connected to the BSC and convert the format of the first received MGW response and then send the response to the BSC. That is, the mode of selecting an MGW by MSC server 2 can be implemented by adopting different policies.

Step 55: MSC server 2 sends the circuit reset/blockage request message after format conversion to the MGW.

Step 56: After receiving the circuit reset/blockage request message converted in format, the MGW resets or blocks A interface circuit L at the local end according to the request.

Step 57: After implementing the operation at the local end, the MGW sends a circuit reset/blockage result message to MSC server 2.

Step 58: MSC server 2 converts the circuit reset/blockage result message that complies with the gateway control protocol into the circuit reset/blockage request message that complies with the BSSAP.

Step 59: MSC server 2 sends the circuit reset/blockage result message that is converted in format to the BSC.

Step 510: The BSC sends the circuit reset/blockage result message to the OM device.

In the preceding step 53, the circuit reset/blockage request message sent by the BSC to MSC server 2 can be forwarded through the MGW connected to this BSC. When the MGW that forwards the circuit reset/blockage request message finds that this message cannot be identified, the MGW forwards the message to the relevant MSC server. The MSC server converts the format of the circuit reset/blockage request message before sending it to the MGW. The subsequent processing process is the same as that in the third embodiment. The MGW selects an MSC server according to the specific MSC pool networking mode. For example, the MGW can select an MSC server at random, or select an MSC server specified by the OM device.

It can be seen from the preceding embodiment that, compared with the existing technology, the method for managing interface circuits between an access network and a core network realizes unified and efficient management for the interface circuits between an access network and a core network. In addition, the control function entity is adopted to convert the format of the circuit management messages between resource management entity and resource coordination entity. Thus, no new protocol stack needs to be developed on the resource management entity, thus reducing the cost of the resource management entity in managing interface circuits between an access network and a core network.

Persons of ordinary skill in the art may understand that all or part of the steps of the method according to the embodiments may be implemented by a program instructing relevant hardware. The program may be stored in a computer readable storage medium. When being executed, this program can include the flows of the methods in the preceding embodiments. The storage medium may be a magnetic disk, a Compact Disk Read-Only Memory (CD-ROM), a Read-Only Memory (ROM) or a Random Access Memory (RAM).

Figure 6:
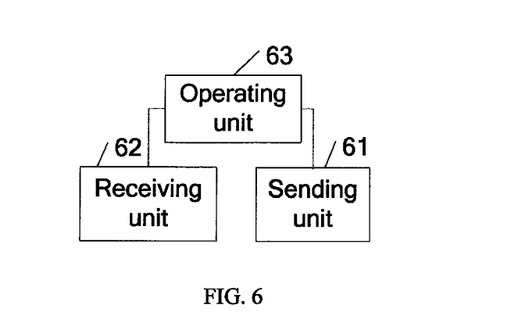
FIG. 6 shows a structure of a resource management entity according to a sixth embodiment.

As shown in FIG. 6, the resource management entity in the six embodiment can include: a sending unit 61, configured to send a circuit management message to a control function entity so that the control function entity converts the circuit management message in format and sends the message to a resource coordination entity, wherein the circuit management message is used to instruct the resource coordination entity to implement a circuit management operation; a receiving unit 62, configured to receive a circuit management message sent by the resource coordination entity, converted in format and forwarded by the control function entity; and an operating unit 63, configured to instruct the sending unit 61 to send the circuit management message after implementing the circuit management operation; or implement the circuit management operation according to the circuit management message received by the receiving unit 62.

In addition, to improve the success rate of the resource management entity in managing interface circuits between an access network and a core network, the receiving unit 62 is also configured to receive a circuit management message sent by the resource coordination entity, converted in format and forwarded by the control function entity; and the sending unit 61 is also configured to send the circuit management result message to the control function entity, wherein the control function entity converts the circuit management message in format and sends the circuit management result message to the resource coordination entity.

The circuit management message includes but is not limited to a circuit reset/blockage request message. The circuit management result message includes but is not limited to a circuit reset/blockage result message.

Figure 7:
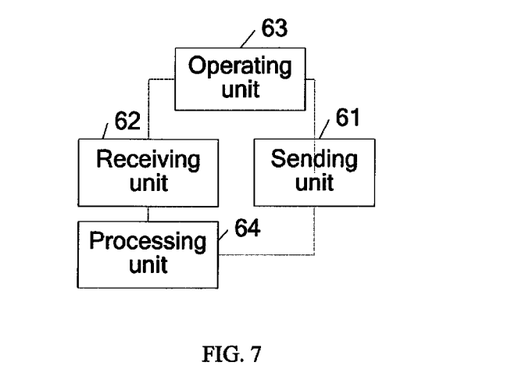
FIG. 7 shows a structure of a resource management entity according to a sixth embodiment.

In addition to circuit reset/blockage, the resource management entity can implement other circuit management operations. For example, the resource management entity can collect statistics about the interface circuits between an access network and a core network or query the usage condition of the interface circuits between an access network and a core network as required by other devices. Therefore, the receiving unit 62 is also configured to receive a circuit query/counting message sent by the control function entity. Accordingly, as shown in FIG. 7, the resource management entity further includes a processing unit 64 that is configured to implement an operation according to the circuit query/counting message. The sending unit 61 is also configured to send a circuit query/counting result to a control function entity according to the operation result of the processing unit 64.

In the circuit domain, the resource management entity can be implemented through an MGW, the control function entity through an MSC server, and the resource coordination entity through a BSC. The interface circuits between an access network and a core network are A interface circuits. In the packet domain, the resource management entity can be implemented through a serving gateway or packet serving node, the control function entity through an MME, and the resource coordination entity through a BSC. The interface circuits between an access network and a core network are S1-MME interface circuits.

Figure 8:
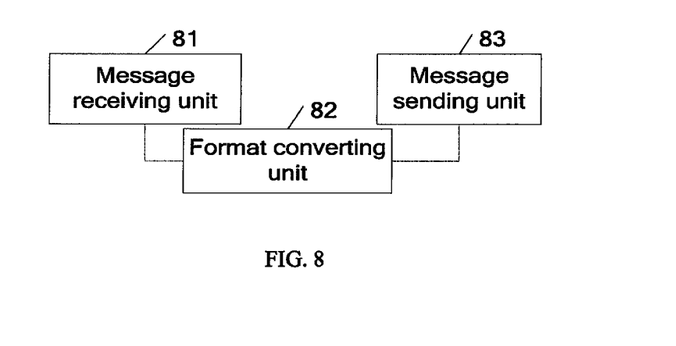
FIG. 8 shows a structure of a control function entity according to a seventh embodiment.

As shown in FIG. 8, the control function entity in the seventh embodiment includes: a message receiving unit 81, configured to receive a circuit management message or a circuit management result message sent by a resource management entity or a resource coordination entity; a format converting unit 82, configured to convert a format of the circuit management message or circuit management result message received by the message receiving unit 81; and a message sending unit 83, configured to: send the circuit management message or circuit management result message after conversion by the format converting unit 82 to the resource coordination entity when the circuit management message or circuit management result message is sent by the resource management entity; or send the circuit management message or circuit management result message after conversion by the format converting unit 82 to the resource management entity when the circuit management message or circuit management result message is sent by the resource coordination entity.

The circuit management message includes but is not limited to a circuit reset/blockage request message. The circuit management result message includes but is not limited to a circuit reset/blockage result message.

The resource management entity can collect statistics about or query circuits. Therefore, the message sending unit 81 is also configured to send a circuit counting/query message to the resource management entity, and the message receiving unit 83 is also configured to receive the circuit counting/query message sent by the resource management entity.

During specific application, in the circuit domain, when the resource management entity is an MGW, the control function entity is an MSC server, the resource coordination entity is a BSC, and the interface circuits between an access network and a core network are A interface circuits, the format converting unit 82 converts the circuit management message or circuit management result message that complies with a gateway control protocol into the circuit management message or circuit management result message that complies with BSSAP, or the circuit management message or circuit management result message that complies with BSSAP into the circuit management message or circuit management result message that complies with the gateway control protocol. The gateway control protocol is the same as that in the previous embodiment.

In the packet domain, the interface circuits between an access network and a core network are S1-MME interface circuits, the resource management entity can be implemented through a serving gateway or packet serving node, the control function entity through an MME, and the resource coordination entity through a BSC. Similar to the principles in the circuit domain, the format converting unit 82 converts formats of the circuit management message and circuit management result message of the resource management entity or resource coordination entity so that the resource management entity or resource coordination entity can identify the circuit management message and circuit management result message.

In the method, device, and system for managing interface circuits between an access network and a core network in embodiments, a control function entity is used to convert the format of the circuit management message between resource management entity and resource coordination entity. In this way, no new protocol needs to be developed on the resource management entity to support management of the resource management entity for the interface circuits between an access network and a core network. Thus, the embodiments reduce the cost of the resource management entity in managing interface circuits between an access network and a core network and improve the operability of the resource management entity for managing interface circuits between an access network and a core network.

The disclosed embodiments are merely exemplary. Those skilled in the art may make various changes and transformations to the presented embodiments without departing from the scope of the claims

What is claimed is:

1. A method for managing interface circuits between an access network and a core network, comprising:

converting in format and sending, by a control function entity within the core network, a circuit management message or a circuit management result message sent by a resource management entity within the core network to a resource coordination entity within the access network, wherein the circuit management result message sent by the resource management entity is forwarded by the control function entity to the resource coordination entity after the resource management entity implements a circuit management operation according to the circuit management message of the resource coordination entity; or converting in format and sending, by the control function entity, the circuit management message or the circuit management result message sent by the resource coordination entity to the resource management entity, wherein the circuit management result message sent by the resource coordination entity is forwarded by the control function entity to the resource management entity after the resource coordination entity implements the circuit management operation according to the circuit management message of the resource management entity;

wherein the interface circuits are A interface circuits between a media gateway and a base station controller, the resource management entity is a media gateway, the control function entity is a mobile switch center server, and the resource coordination entity is a base station controller;

the converting by the control function entity of a format of the circuit management message or circuit management result message sent by the resource management entity comprises:

converting, by the control function entity, a circuit management message or circuit management result message that complies with a gateway control protocol into a circuit management message or circuit management result message that complies with a Base Station System Application Part (BSSAP) protocol; and the converting by the control function entity of a format of the circuit management message or circuit management result message sent by the resource coordination entity comprises:

converting, by the control function entity, the circuit management message or circuit management result message that complies with the BSSAP protocol into the circuit management message or circuit management result message that complies with the gateway control protocol.

2. The method according to claim 1, wherein:

the interface circuits are S1-MME interface circuits, the resource management entity is a serving gateway or packet serving node, the control function entity is a mobile management entity, and the resource coordination entity is a base station controller.

3. A resource management entity, comprising:

a sending unit, configured to: send a circuit management message to a control function entity so that the control function entity converts the circuit management message in format and sends the circuit management message to a resource coordination entity, wherein the circuit management message is used to instruct the resource coordination entity to implement a circuit management operation;

a receiving unit, configured to receive another circuit management message sent by the resource coordination entity, converted in format and forwarded by the control function entity; and an operating unit, configured to instruct the sending unit to send the circuit management message after implementing the circuit management operation; or implement the circuit management operation according to the circuit management message received by the receiving unit;

wherein the receiving unit is configured to receive a circuit management result message sent by the resource coordination entity, converted in format and forwarded by the control function entity; and the sending unit is configured to send the circuit management result message to the control function entity, wherein the control function entity converts the circuit management result message in format and sends the circuit management result message to the resource coordination entity after format conversion.

4. A control function entity, comprising:

a message receiving unit, configured to receive a circuit management message or a circuit management result message sent by a resource management entity within a core network or a resource coordination entity within an access network;

a format converting unit, configured to convert a format of the circuit management message or circuit management result message received by the message receiving unit; and a message sending unit, configured to: send the circuit management message or circuit management result message after conversion by the format converting unit to the resource coordination entity when the circuit management message or circuit management result message is sent by the resource management entity; or send the circuit management message or circuit management result message after conversion by the format converting unit to the resource management entity when the circuit management message or circuit management result message is sent by the resource coordination entity;

wherein the format converting unit converts a circuit management message or circuit management result message that complies with a gateway control protocol into a circuit management message or circuit management result message that complies with a Base Station System Application Part (BSSAP) protocol; or converts the circuit management message or circuit management result message that complies with the BSSAP protocol into the circuit management message or circuit management result message that complies with the gateway control protocol.

* * * * *